United States Patent
Mack

(10) Patent No.: US 9,257,869 B2
(45) Date of Patent: Feb. 9, 2016

(54) METHOD AND DEVICE FOR CHARGING A BATTERY

(75) Inventor: Juergen Mack, Goeppingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 663 days.

(21) Appl. No.: 13/639,681

(22) PCT Filed: Feb. 23, 2011

(86) PCT No.: PCT/EP2011/052690
§ 371 (c)(1),
(2), (4) Date: Dec. 17, 2012

(87) PCT Pub. No.: WO2011/124411
PCT Pub. Date: Oct. 13, 2011

(65) Prior Publication Data
US 2013/0113439 A1    May 9, 2013

(30) Foreign Application Priority Data
Apr. 8, 2010  (DE) .................... 10 2010 003 703

(51) Int. Cl.
*H01M 10/44*   (2006.01)
*H01M 10/46*   (2006.01)
*H02J 7/06*    (2006.01)
*H01M 10/0525* (2010.01)
*H02J 7/00*    (2006.01)
*H02J 7/04*    (2006.01)

(52) U.S. Cl.
CPC ............. *H02J 7/06* (2013.01); *H01M 10/0525* (2013.01); *H01M 10/44* (2013.01); *H02J 7/0077* (2013.01); *H02J 7/0081* (2013.01); *H02J 7/045* (2013.01); *Y02E 60/122* (2013.01)

(58) Field of Classification Search
CPC ......... H02J 7/0077; H02J 7/042; H02J 7/008; H02J 7/0081; H02J 7/0083; H01M 10/44; H01M 10/46
USPC .................................. 320/124, 137, 160, 163
See application file for complete search history.

(56) References Cited

U.S. PATENT DOCUMENTS

| | | | |
|---|---|---|---|
| 5,408,170 A | 4/1995 | Umetsu et al. | |
| 5,861,733 A | 1/1999 | Yoshikawa et al. | |
| 5,923,149 A | 7/1999 | Umetsu | |
| 2005/0264263 A1* | 12/2005 | Tsenter ........................ | 320/128 |

(Continued)

FOREIGN PATENT DOCUMENTS

| | | |
|---|---|---|
| CN | 1044052 | 7/1999 |
| CN | 1320723 | 6/2007 |

(Continued)

*Primary Examiner* — Edward Tso
(74) *Attorney, Agent, or Firm* — Kenyon & Kenyon LLP

(57) ABSTRACT

A method for charging a battery, in particular a lithium ion battery, be performing the following: charging the battery using a constant charging current in a first phase, charging the battery using a constant charging voltage in a subsequent second phase, ending the charging as a function of a specifiable boundary value of the charging current in the second phase. In this context, the following operations are provided: comparing a guide voltage specified for setting the constant voltage to at least one stored switch-off value determined as a function of the boundary value, and ending the charging when the guide voltage reaches the switch-off value. Also described is a device for charging the battery.

10 Claims, 2 Drawing Sheets

(56) References Cited

U.S. PATENT DOCUMENTS

2007/0103118 A1 5/2007 Takagi et al.
2008/0054846 A1 3/2008 Hsu et al.

FOREIGN PATENT DOCUMENTS

| CN | 101355264 A | 1/2009 |
| CN | 101364743 A | 2/2009 |

* cited by examiner

METHOD AND DEVICE FOR CHARGING A BATTERY

FIELD OF THE INVENTION

The present invention relates to a method for charging a battery, in particular a lithium ion battery, having the following steps: The battery is first charged using a constant charging current in a first phase, then, in a subsequent second phase, using a constant charging voltage, the charging being terminated as a function of a specifiable boundary value of the charging current in the second phase. The present invention also relates to a device for charging a battery, in particular for carrying out the method described above, having at least one current regulator for charging the battery using a constant charging current in a first phase and at least one voltage regulator for charging the battery using a constant voltage in a subsequent second phase, as well as using a device for ending the charging as a function of a specifiable boundary value of the charging current during the second phase.

BACKGROUND INFORMATION

Methods and devices for charging a battery are believed to be discussed in the related art. By the term battery one should also understand, in this instance, individual or several cells of a battery or of an accumulator. For lithium ion batteries it is particularly known that one may use the so-called IU charging method, which is also designated as CCCV charging method (constant current constant voltage). In this method, the battery is charged in a first phase (I charging) at constant current, while the charging voltage increases. The current is limited, in this instance, by a current regulator of the device, or rather, of the charging unit. Upon reaching a selected end-of-charge voltage at the battery, one switches over from constant current control to voltage control, at which the battery is loaded further at constant voltage. At an increasing charging level of the battery, the charging current drops automatically. It is known that, as a criterion for ending the charging, one may use the falling below of a specifiable boundary value by a falling charging current.

In order to carry out or map the abovementioned charging method, the recording of the charging current and its preparation in signal technology are required.

SUMMARY OF THE INVENTION

It is provided, in accordance with the present invention, that a guide voltage, specified for setting the constant voltage, be compared to at least one stored switch-off value that is determined as a function of the boundary value, and the charging is ended when the guide voltage reaches the switch-off value. Thus, it is provided, in this instance, that for ending the charging process, not the charging current itself, but a switch-off value, that takes into account the boundary value of the charging current, is used as the criterion. The charging current, that drops off during the second phase, is consequently taken into account indirectly. The switch-off value is selected in such a way that it corresponds to the guide voltage at the time of the reaching of the specified boundary value by the charging current. All in all, a charging process may thereby be ended at a favorable time in a simple way without the detecting and evaluating of the charging current having to take place during the second phase.

The switch-off value may be calculated and/or ascertained by empirical investigation. The investigations may be carried out so that the charging current as well as the guide voltage are recorded and compared to each other in the second phase. At the time at which the charging current reaches the specifiable boundary value, the current guide voltage is ascertained and stored.

The guide voltage may be specified as a function of a source voltage, a battery voltage and/or as a function of component parts used for the voltage control. The whole controlled system of the voltage regulator may be taken into account in determining the guide voltage, so that an optimal degree of charging is attained.

An individual switch-off value may be filed for each battery that is to be charged. Thus it is possible, when using the advantageous method, to charge a plurality of batteries in optimal fashion, or to adapt the method automatically to different batteries.

Especially, for the comparison, one of the individual switch-off values may be selected as a function of the battery voltage of the respective battery. The abovementioned variation of the guide voltage at the same current and at different battery voltage, has the result that the switch-off time over various battery voltages is subject to a certain fuzziness. By taking into account, or rather, by filing characteristics values individual to each battery, as was described above, one is able to compensate for this fuzziness by selecting the appropriate switch-off value for the battery to be charged. During the second phase, the battery voltage is constant, and is determined by the development of the battery itself. The battery voltage is easy to record using measuring techniques.

The device according to the present invention stands out in that the device includes at least one control unit, which compares a guide voltage present at the output of the voltage regulator to a switch-off value, stored in a memory of the device and determined as a function of the boundary value, and that it ends the charging when the guide voltage attains the switch-off value. Thus, the device includes a memory in which at least one switch-off value is stored, or rather, as described above, becomes stored. The control unit accesses the stored switch-off value and compares it to the guide voltage present at the output of the voltage regulator, which, as stated above, is used for attaining the degree of charging. When the guide voltage reaches the switch-off value, which corresponds to the time at which the charging current reaches the specifiable boundary value, the charging process is ended. To end the charging process, a switching element may be provided which is able to be actuated by the control unit and which cuts the electrical connection to the battery.

Additional advantages proceed from the method described above. The voltage regulator and/or the current regulator may include at least one operational amplifier, so that the voltage regulation and the current regulation take place in an analog manner and are implemented cost-effectively.

The control unit may include at least one microcontroller, to which the guide voltage is supplied, and which compares this to the switch-off value(s) stored in the memory. Particularly, at least one analog/digital converter may be assigned to the microcontroller, with the aid of which the guide voltage is recorded and supplied to the microcontroller for comparison.

According to one advantageous further development of the device, a measuring arrangement is provided which recognizes the battery that is to be charged. This arrangement may be, for example, a voltage measuring device which records the voltage of the battery to be charged and concludes thereby that it is a certain battery. Thus, during the comparison of the guide voltage to the switch-off value, the individual switch-off value assigned to the battery may be selected in a simple manner.

In the following text, the present invention is to be elucidated in greater detail with the aid of the drawings.

DETAILED DESCRIPTION

Figure 1:
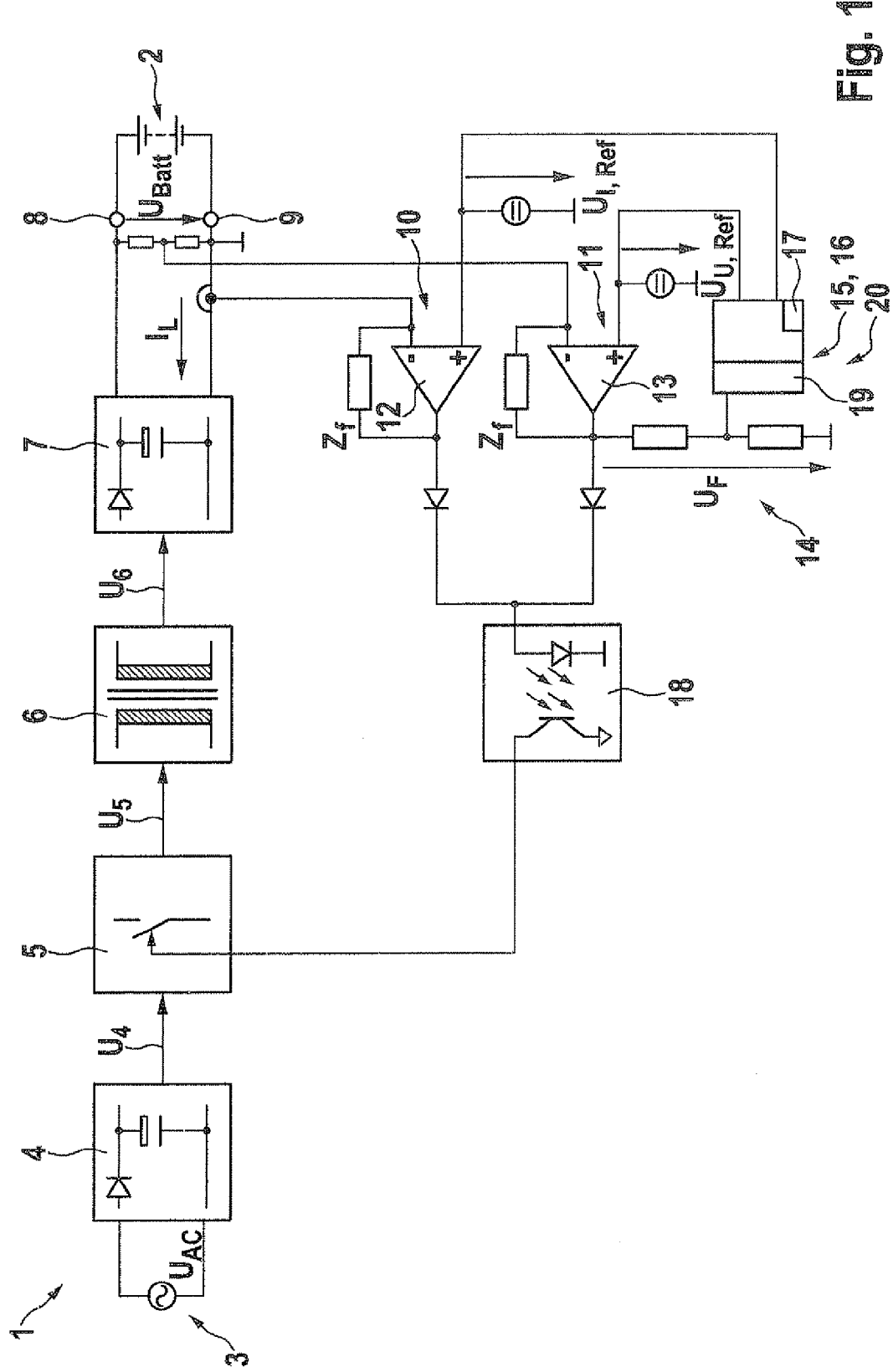
FIG. 1 shows a device for charging a battery in a schematic representation.

In a schematic representation, FIG. 1 shows a device 1 for charging a battery 2. Device 1 has an alternating voltage source 3 or is able to be connected to it. Source voltage $U_{AC}$ supplied by alternating voltage source 3 is supplied to a rectifier 4, which converts alternating voltage $U_{AC}$ to a direct voltage $U_4$, which is supplied to a switch 5. Switch 5 may be one or more semiconductor elements, and particularly may be MOSFET's, bipolar transistors or IGBT's. Alternating voltage $U_5$, that is to be output by switch 5, is set by specifying the switching frequency. The former is supplied to a transformer 6, which transforms alternating voltage $U_5$ to an alternating voltage $U_6$, in a known manner. A second rectifier 7 is post-connected to transformer 6, and it rectifies alternating voltage $U_6$, and provides it at terminals 8, 9 to battery 2.

In addition, device 1 includes an analog current regulator 10 as well as an analog voltage regulator 11, each of which includes an operational amplifier 12 and 13, respectively. Current regulator 10 is developed to charge the battery using a constant charging current, while voltage regulator 11 is developed to charge the battery using a constant voltage. At the output of voltage regulator 11, a guide voltage $U_F$ is set, which is recorded using a voltage divider 14 and supplied to a control unit 15, which includes a microcontroller. A memory, in particular a non-volatile memory 17 is assigned to microcontroller 16, in which comparison values are stored, which will be discussed in greater detail below. For potential isolation, an opto-coupler 18 follows current regulator 10 and voltage regulator 11, whose output is connected to an input of switch 5.

Figure 2:
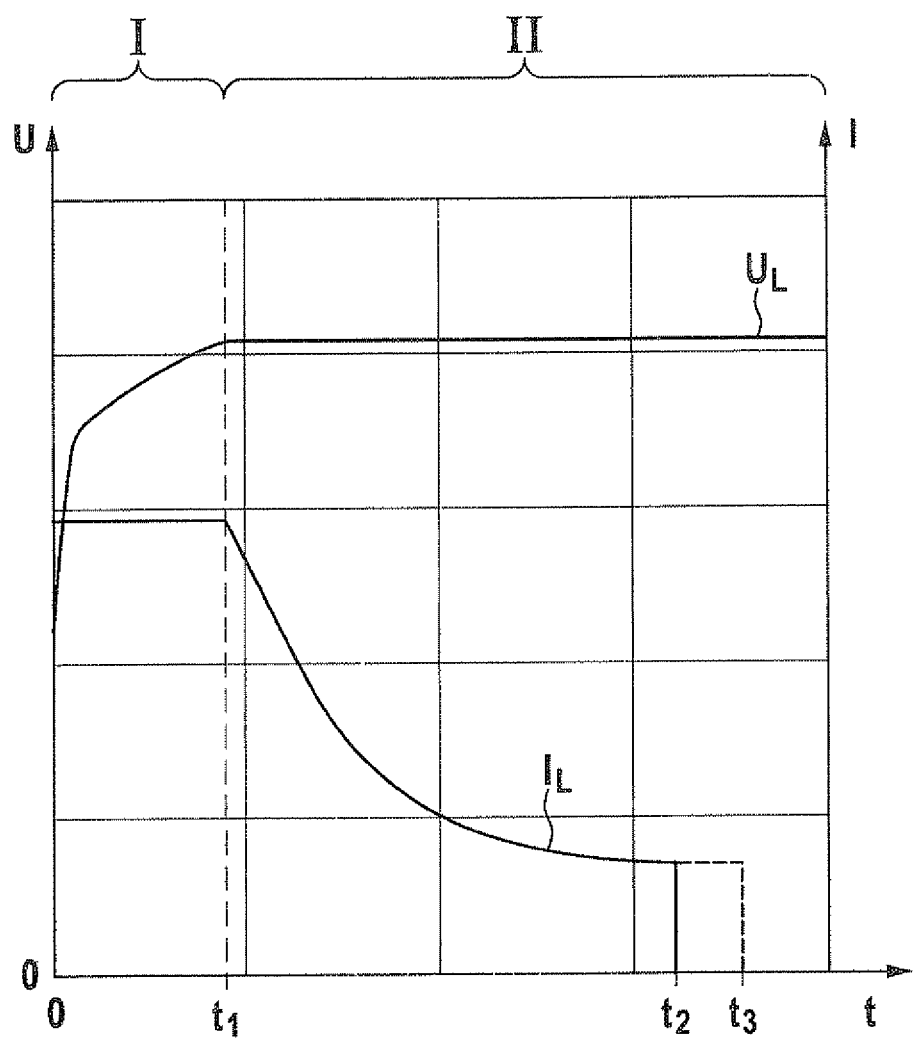
FIG. 2 shows a charging curve of a lithium ion battery.

The method for charging battery 2 will be explained with the aid of the diagram shown in FIG. 2. First, using current regulator 10, battery 2 is charged at a constant charging current $I_L$. In this first phase I, charging voltage $U_L$ of battery 2 increases. As soon as charging voltage $U_L$ has reached a specifiable maximum voltage value, as characterized by time $t_1$, the current-regulated method changes to a voltage-regulated method, in that in phase II, following first phase I, battery 2 is charged by voltage regulator 11 at a constant voltage. In second phase II, current $I_L$ of battery 2 drops off. In order to hold charging voltage $U_L$ constant, guide voltage $U_F$ is varied. A microcontroller 16 records guide voltage $U_F$, in this context, and compares it to the values stored in memory 17.

The stored values are switch-off values which correspond to guide voltage $U_F$ at a time $t_2$, at which the loading current $I_L$ reaches a boundary value, as of which the charging process is to be broken off. Individual switch-off values stored in memory 17 refer to the different batteries that are to be charged by device 1, so that, for each battery to be charged, an individual switch-off value is stored. The switch-off values have been ascertained ahead of time by empirical trials. For the purpose of recording and comparing guide variable $U_F$ to the respective switch-off value, an analog/digital converter 19 is assigned to microcontroller 16, which is connected to voltage divider 14. The microcontroller now compares the guide voltage to the corresponding switch-off value. At a given battery voltage $U_{Batt}$, microcontroller 16 is able to branch to the corresponding storage location in memory 17, and draw upon the individual switch-off value, stored there, to form the switch-off criterion. When guide voltage $U_F$ reaches the switch-off value, the charging process is ended by device 1, for instance, by opening switch 5. Thus, control unit 15, having microcontroller 16 and analog/digital converter 19, as well as memory 17, together form a device 20 for ending the charging.

The time to end the charging process individually for each battery or cell is able to be determined by providing individual switch-off values. Thus, for example, one may take into account that the charging current $I_L$ of another battery reaches the specifiable boundary value only at a later time $t_3$, as indicated in FIG. 2.

By device 1 described above, as well as by the method described, the time for ending the charging process is consequently not directly determined as a function of charging current $I_L$, as usual, but as a function of guide voltage $U_F$. Because of that, in particular, a recording arrangement for recording charging current $I_L$ may be omitted, and device 1 as well as the method for charging the battery may be configured to be cost-effective and simpler.

What is claimed is:

1. A method for charging a battery, the method comprising:
   charging the battery using a constant charging current in a first phase;
   charging the battery using a constant charging voltage in a subsequent second phase;
   comparing a guide voltage, specified for setting the constant voltage, to at least one stored switch-off value that is determined as a function of a specifiable boundary value of the charging current in the second phase; and
   ending the charging when the guide voltage reaches the switch-off value.

2. The method of claim 1, wherein the switch-off value is determined by empirical investigation.

3. The method of claim 1, wherein the guide voltage is specified as a function of at least one of a source voltage, a battery voltage, and a function of component parts used for the voltage regulation.

4. The method of claim 1, wherein for each battery to be charged, an individual switch-off value is stored.

5. The method of claim 1, wherein for the comparison, one of the individual switch-off values is selected as a function of the battery voltage of the respective battery.

6. A device for charging a battery, comprising:
   at least one current regulator for charging the battery using a constant charging current in a first phase;
   at least one voltage regulator for charging the battery using a constant charging voltage in a subsequent second phase; and
   a charge-ending device for ending the charging, wherein the device includes at least one control unit, which compares a guide voltage supplied to the voltage regulator to at least one switch-off value that is stored in a memory of the device and determined as a function of a specifiable boundary value of the charging current, and the charging is ended when the guide voltage reaches the switch-off value.

7. The device of claim 6, wherein at least one of the voltage regulator and the current regulator include at least one operational amplifier.

8. The device of claim 6, wherein the control unit includes at least one microcontroller.

9. The device of claim 6, wherein at least one analog/digital converter is assigned to the microcontroller.

10. The method of claim 1, wherein the battery is a lithium ion battery.

* * * * *